Nov. 6, 1934.        R. J. TURNER ET AL        1,980,117
NONMETALLIC CONNECTION
Filed Feb. 9, 1928

INVENTORS.
Russell J. Turner and
Frederick H. Ragan
BY
Fay, Oberlin & Fay
ATTORNEYS Patented Nov. 6, 1934

1,980,117

UNITED STATES PATENT OFFICE 1,980,117

NONMETALLIC CONNECTION

Russell J. Turner, Butler, Pa., and Frederick H. Ragan, Shaker Heights, Ohio, assignors to The Columbia Axle Company, Cleveland, Ohio, a corporation of Ohio Application February 9, 1928, Serial No. 253,031

4 Claims. (Cl. 287—90)

The present invention, relating as indicated to non-metallic connections, is particularly directed to a new and improved construction of connection between two metal articles in which non-metallic, compressible and relatively yielding material is interposed between the metallic elements to prevent metal to metal contact, thereby preventing wear, and to cushion and absorb blows which otherwise would be transmitted from one element to the other. A further object of the invention is the provision of a non-metallic connection which is extremely simple in construction and which is adapted to allow for slight relative oscillatory movement between the two metal elements in question.

To the accomplishment of the foregoing and related ends, said invention, then, consists of the means hereinafter fully described and particularly pointed out in the claims; the annexed drawing and the following description setting forth in detail certain mechanism embodying the invention, such disclosed means constituting, however, but one of various mechanical forms in which the principle of the invention may be used.

In said annexed drawing:—

Figure 1:
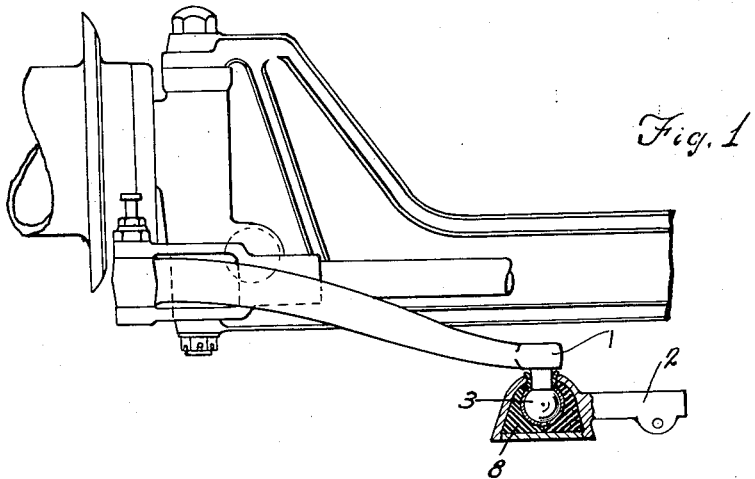
Figure 2:
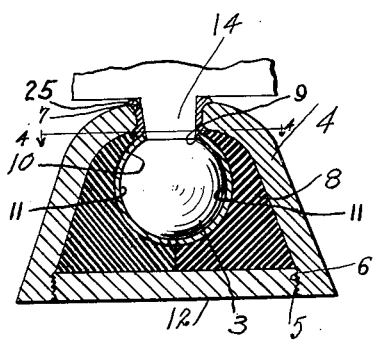
Figure 5:
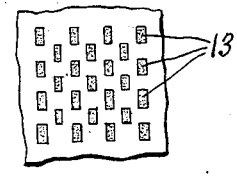
Figure 4:
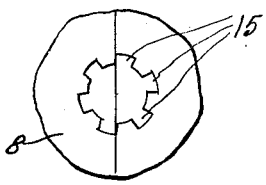
Figure 3:
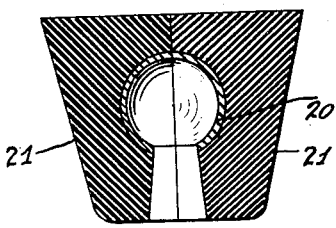
Figure 6:

Fig. 1 is a side elevation showing one application of our invention to a steering means; Fig. 2 is a transverse vertical section showing the present non-metallic connection embodied in what is commonly known as a tie rod; Fig. 3 is a similar section showing a modification of the non-metallic connecting means; Fig. 4 is a section on the line 4—4, Fig. 2; Fig. 5 is a plan view of one type of bearing element which may be used in the present invention; and Fig. 6 is a transverse vertical section showing a compressible packing ring for sealing the interior of the socket member against entrance of foreign material.

Referring now to Fig. 1, in which there is shown, for the purpose of illustration, a tie rod, commonly employed in the steering connections of motor vehicles between the steering column and the wheels, there are shown the two elements or rods 1 and 2 which are to be connected, and it will be understood, in considering these two members, that they merely typify any two metallic elements which are to be connected and which have some slight oscillatory movement therebetween. It is customary in connecting such two members in a train of steering connections in a motor vehicle to form a hardened ball end on one of the elements and a corresponding spherical seat for a housing secured on the adjacent end of the other element. The ball is then placed in the seat and there retained by some such means as a metallic spring and a sealing plug, the movement of the elements being such that the ball pulls against the spherical seat in ordinary operation and is at the same time allowed to swing slightly with respect to the seat during movement. The chief difficulty in such construction is to prevent undue wear between the ball and seat, which will produce play and noise, and at the same time to prevent unequal wear by reason of the shocks which are continually transmitted through the connections in a steering train.

In the present construction the element 1 is provided with a spherical end 3, and the element 2 is formed with a socket member 4, said element being formed as a separate member removably engageable on the actuating element for the steering train in any ordinary manner. The socket member 4 may conveniently be formed of a rough forging which need not be externally machined, but is merely provided with threads 5 around the edge of the recess 6 which is formed therein. This recess 6 may be left unmachined and is of a general tapered form connecting with an opening 7 formed at the bottom of the recess for receiving therein the element 1 when the members 1 and 4 are assembled.

Our improved non-metallic connection between the members consists of a block or inset 8 of compressible and yielding material, such, for example, as rubber, provided with an opening 9, through which the element 1 may project, and with a central spherical recess 10, in which are mounted two semispherical elements 11. These bearing elements may be formed of any suitable bearing material, such for example as brass hard rubber or the like, and are desirably provided with a multiplicity of indentations 13 on their inner surfaces, which are filled with a lubricating composition, such as graphite and a suitable binder, so that the slight relative movement which occurs between the ball 3 and the bearing elements is automatically lubricated by the lubricant in this multiplicity of recesses in the bearing members. The inset 8 may be conveniently formed in two halves split on a central vertical plane, as viewed in Fig. 2, and the semispherical bearing elements may be set into the recesses in the two halves and the two halves engaged about the ball end 3. The inset 8 is shown as being split in a plane coinciding with the split of the bearing elements, however, it is preferred that the inset be split in a plane at right angles to that of the split of the bearing elements in order that there be no danger of binding because of one edge of a bearing element engaging one edge of the split inset. These elements as thus assembled are then assembled into the socket from the open end, the element 3 being passed through said open end, and screwed onto the tapering end 14 of element 1, following which the resilient blocks are seated in the socket 4, after which a threaded disk 12 may be screwed into the threaded lower end of the socket to press the resilient material firmly into place, and to place the same under a considerable compression.

The assembly of the various elements as just described causes the rubber to be placed under a very considerable compression, forcing the rubber to flow up around the tapered lower end 14 of the element 1 and forcing it slightly into the opening left between the lower end of this element and the walls of the opening 7 in the upper end of the socket, but leaving a sufficient clearance at this point to permit the element 1 to have a slight oscillatory movement with respect to the socket 4. Shocks, which would otherwise be transmitted from one element to the other are absorbed through the yielding compressible material, and thus the entire train of mechanism is cushioned against damage from this cause, while the actual movement between the parts is still permitted and is lubricated by the self-lubricating qualities in the semi-spherical bearing elements mounted in the resilient insets.

To prevent any undue binding of the resilient material about the tapered end 14 of the element 1 when the yielding material has been placed under heavy compression the upper portion or neck of the insets may be formed with a series of serrations or slots 15 around their inner surfaces to provide for flow of material under compression. This feature of the construction prevents any stiffness between the two elements and allows of the free oscillatory movement between the elements 1 and the socket 4.

In Fig. 3 I have shown a modification of the construction described above, the modification consisting in forming bearing elements 20, in which the ball 3 is mounted, of a composition of rubber and graphite which are then integrally united to the respective insets 21.

In Fig. 6 there is shown a cylindrical washer 25 which may desirably be formed of some material such as rubber, and which may be mounted in the opening 7 in the socket member 4. This member acts as a seal between the walls of the socket member and the rod 1, and is of such proportions that upon the assembly of these elements it will be considerably compressed. In order to prevent binding between the walls of the socket and the rod the member 25 is formed with serrations 26 around its inner surface which provide a place for the remaining material to flow when compressed.

It will be understood of course that while we have shown the present invention as embodied in a tie rod, various other constructions may be employed embodying the same invention in different mechanism and for different uses. The advantages of the present construction are its extreme simplicity and low cost and the avoidance of practically all wear, as well as the cushioning of all shocks which otherwise would be transmitted through the members, resulting in a silent and long wearing connection for metallic members.

Other modes of applying the principle of our invention may be employed instead of the one explained, change being made as regards the mechanism herein disclosed, provided the means stated by any of the following claims or the equivalent of such stated means be employed.

We therefore particularly point out and distinctly claim as our invention:—

1. In a device of the character described, the combination of a socket member provided with a recess having one open side and an opening in the wall opposite thereto, a rod extending through said opening and having a spherical end, two semi-spherical self-lubricating bearing elements disposed about said spherical end, resilient deformable material disposed in said recess about said semi-spherical elements, and means for maintaining the same under a predetermined compression.

2. In a device of the character described, the combination of a socket member provided with a recess having one open side and an opening in the wall opposite thereto, a rod extending through said opening and having a spherical end, two semi-spherical self-lubricating bearing elements disposed about said spherical end, yielding rubber filling blocks disposed in said recess about said bearing elements and filling the space between the latter and the wall of said recess, and means for maintaining the same under a predetermined compression.

3. In a device of the character described, the combination of a socket member provided with a recess having one open side and an opening in the wall opposite thereto, a rod extending through said opening and having a spherical end, two semi-spherical self-lubricating bearing elements disposed about said spherical end, yielding rubber blocks integrally united to said bearing elements and filling the space between the latter and the walls of said recess, and means for maintaining the same under a predetermined compression.

4. In a device of the character described, the combination of a socket member provided with a recess having one open side and an opening in the wall opposite thereto, a rod extending through said opening and having a spherical end, two semi-spherical self-lubricating bearing elements disposed about said spherical end, yielding rubber blocks integrally united to said bearing elements and filling the space between the latter and the walls of said recess, and a cover adjustably engaged in said socket element to close the open side thereof, said cover also maintaining said rubber block under compression.

FREDERICK H. RAGAN.
RUSSELL J. TURNER.